US012523813B1

(12) United States Patent
Thackston et al.

(10) Patent No.: US 12,523,813 B1
(45) Date of Patent: Jan. 13, 2026

(54) DIELECTRIC LINED WAVEGUIDES

(71) Applicant: GENERAL ATOMICS, San Diego, CA (US)

(72) Inventors: Kyle Andrew Thackston, San Diego, CA (US); John Doane, Fullerton, CA (US); James Anderson, San Diego, CA (US)

(73) Assignee: General Atomics, San Diego, CA (US)

( * ) Notice: Subject to any disclaimer, the term of this patent is extended or adjusted under 35 U.S.C. 154(b) by 463 days.

(21) Appl. No.: 18/082,501

(22) Filed: Dec. 15, 2022

Related U.S. Application Data

(60) Provisional application No. 63/401,289, filed on Aug. 26, 2022.

(51) Int. Cl.
*G02B 6/02* (2006.01)
*G02B 6/024* (2006.01)

(52) U.S. Cl.
CPC ........... *G02B 6/0238* (2013.01); *G02B 6/024* (2013.01)

(58) Field of Classification Search
CPC ........ H01P 1/042; H01P 11/002; H01P 3/123; H01P 3/127; H01P 3/14; H01P 3/12; H01P 9/02; H01P 3/16; H01P 5/02; H01P 3/121; H01P 1/2088; H01P 1/207; H01P 3/13; H01P 3/026; H01P 5/087; H01P 1/04; H01P 1/208; H01P 5/024; H01P 9/00;

(Continued)

(56) References Cited

U.S. PATENT DOCUMENTS 5,182,849 A * 2/1993 Marco .................... H01P 11/002 29/600
5,605,716 A * 2/1997 Croitoru ................ G02B 6/032 427/337

(Continued)

OTHER PUBLICATIONS

Boyd et al; "WT4 Millimeter Waveguide System: Waveguide Design and Fabrication"; The Bell System Technical Journal; vol. 56; No. 10; Dec. 1977; pp. 1873-1897.

(Continued)

*Primary Examiner* — John W Poos
(74) *Attorney, Agent, or Firm* — Fitch, Even, Tabin & Flannery LLP

(57) ABSTRACT

One or more aspects of the present disclosure include coating the inside of an overmoded, smooth wall metallic waveguide with a thin dielectric layer. Coating the inside of a waveguide with a dielectric layer, as described in more detail herein, may result in similar boundary conditions to corrugated waveguides and may achieve extremely low transmission loss (e.g., propagating the HE11 mode). Such dielectric lined waveguides are an efficient (e.g., cost-effective) alternative to corrugated waveguides (e.g., for broadband microwave transmission, particularly at frequencies above 300 GHz). The systems and techniques described herein may improve hybrid electric mode purity (e.g., HE11 mode purity of approximately 98%). Dielectric lined waveguides described herein may have applications in many fields demanding low attenuation millimeter and terahertz transmission (e.g., such as radar, high-frequency communication systems, THz dynamic nuclear polarization, electron cyclotron heating in magnetically confined fusion experiments, etc.).

20 Claims, 4 Drawing Sheets

(58) Field of Classification Search
CPC .. H01P 1/08; H01P 1/161; H01P 3/081; H01P 5/08; H01P 5/082; H01P 5/107; H01P 5/12; H01P 1/2002; H01P 1/2138; H01P 3/06; H01P 7/06; H01P 1/02; H01P 1/16; H01P 1/162; H01P 11/001; H01P 3/00; H01P 3/165; H01P 5/00; H01P 1/00; H01P 1/022; H01P 1/066; H01P 1/18; H01P 1/183; H01P 1/30; H01P 1/387; H01P 11/006; H01P 3/02; H01P 5/04; H01P 5/1007; H01P 5/103; H01P 5/18; H01P 5/181; H01P 5/20; H01P 7/065; H01P 7/10; H01P 1/061; H01P 1/068; H01P 1/14; H01P 1/19; H01P 1/20; H01P 1/2039; H01P 1/262; H01P 1/28; H01P 1/365; H01P 1/38; H01P 1/39; H01P 11/007; H01P 3/08; H01P 3/18; H01P 5/1022; H01P 5/182
See application file for complete search history.

(56) References Cited

U.S. PATENT DOCUMENTS 6,573,813 B1 * 6/2003 Joannopoulos .... G02B 6/02042 333/242
2018/0040936 A1 * 2/2018 Yoshimoto ............ H01P 11/006
2019/0312325 A1 * 10/2019 Ahirwar .................... H01P 3/16
2021/0367316 A1 * 11/2021 Roos ..................... H01P 11/002

OTHER PUBLICATIONS

Carlin et al; "Normal Modes in Overmoded Dielectric-Lined Circular Waveguide"; The Bell System Technical Journal; vol. 52; No. 4; Apr. 1973; pp. 453-486.
Clarricoats et al; "Low-Attenuation Characteristics of Dielectric-Lined Waveguide"; Electronics Letters; vol. 8; No. 16; Aug. 10, 1972; pp. 407-409.
Kreipe et al; "Imperfections in Lined Waveguide"; The Bell System Technical Journal 41; Sep. 1962; pp. 1589-1619.
Lee et al; "Normal Modes in an Overmoded Circular Waveguide Coated with Lossy Material"; IEEE Transactions on Microwave Theory and Techniques; vol. MTT-34; No. 7; Jul. 1986; pp. 773-785.
Mitrofanov et al; "Dielectric-lined Cylindrical Metallic THz Waveguides: Mode Structure and Dispersion"; Optics Express; vol. 18; No. 3; Feb. 1, 2010; pp. 1898-1903.
Miyagi et al; "Transmission Characteristics of Dielectric-Coated Metallic Waveguide for Infrared Transmission: Slab Waveguide Model"; IEEE Journal of Quantum Electronics, vol. QE-19; No. 2; Feb. 1983; pp. 136-144.
Unger; "Circular Electric Wave Transmission in a Dielectric-Coated Waveguide"; The Bell System Technical Journal 36; Sep. 1957; pp. 1253-1278.
Unger; "Lined Waveguide"; The Bell System Technical Journal 41; Mar. 1962; pp. 745-768.

* cited by examiner

DIELECTRIC LINED WAVEGUIDES

This application claims the benefit of U.S. Provisional Application No. 63/401,289, filed Aug. 26, 2022, for ANODIZED CERAMIC LINED METAL STRUCTURES AS WAVEGUIDES, which is incorporated in its entirety herein by reference.

BACKGROUND OF THE INVENTION

1. Field of the Invention

The present invention relates generally to transmission waveguides, and more specifically to dielectric lined waveguides for low loss millimeter wave and terahertz transmission.

2. Discussion of the Related Art

Various systems and processes are known in the art for dielectric lined waveguides.

Electromagnetic radiation may include or refer to waves of the electromagnetic field. In other words, electromagnetic waves may propagate through space and carry electromagnetic radiant energy. For instance, electromagnetic waves may include radio waves, microwaves, infrared waves, (visible) light waves, ultraviolet waves, X-rays, and gamma rays.

Electromagnetic waves may thus carry energy that may be harnessed or utilized for various applications. A waveguide is a structure that guides waves (e.g., for more efficient energy applications). For example, a waveguide may guide waves (e.g., with minimal loss of energy) by restricting the transmission of energy to one direction. Without the physical constraint of a waveguide, wave intensities decrease (e.g., according to the inverse square law as the waves expand into three dimensional space). Accordingly, waveguides may have many uses, including transmitting power between the components of a system (e.g., such as transmitting power between radio devices, radar devices, optical devices, etc.).

There are different types of waveguides for different types of waves. In some implementations, a waveguide may include a hollow conductive metal pipe used to carry high frequency radio waves (e.g., such as microwaves). In some cases, dielectric waveguides may be used at higher radio frequencies, transparent dielectric waveguides and optical fibers may be used as waveguides for light, etc. Further, in acoustics, air ducts and horns may be used as waveguides for sound in musical instruments and loudspeakers (e.g., and specially-shaped metal rods conduct ultrasonic waves in ultrasonic machining).

In many cases, the geometry of a waveguide reflects its function. For example, some waveguides may channel waves in one dimension, some two-dimensional slab waveguides may confine waves to two dimensions, etc. Moreover, the frequency of a transmitted wave may also dictate the size of a waveguide (e.g., waveguides may have a cutoff wavelength determined by its size and may not conduct waves of greater wavelength, an optical fiber that guides light may not efficiently transmit microwaves which have a much larger wavelength).

SUMMARY

An apparatus, system, and method for dielectric lined waveguides for low loss millimeter wave and terahertz transmission are described. One or more aspects of the apparatus, system, and method include a metallic waveguide having a hollow tube structure; an anodized interior of the hollow tube structure; and a microwave energy source directed through the hollow tube structure.

A method, apparatus, and system for dielectric lined waveguides for low loss millimeter wave and terahertz transmission are described. One or more aspects of the method, apparatus, and system include fabricating a hollow metal tube; anodizing an interior of the hollow metal tube; and directing microwave energy through the hollow metal tube.

DETAILED DESCRIPTION

Figure 1:
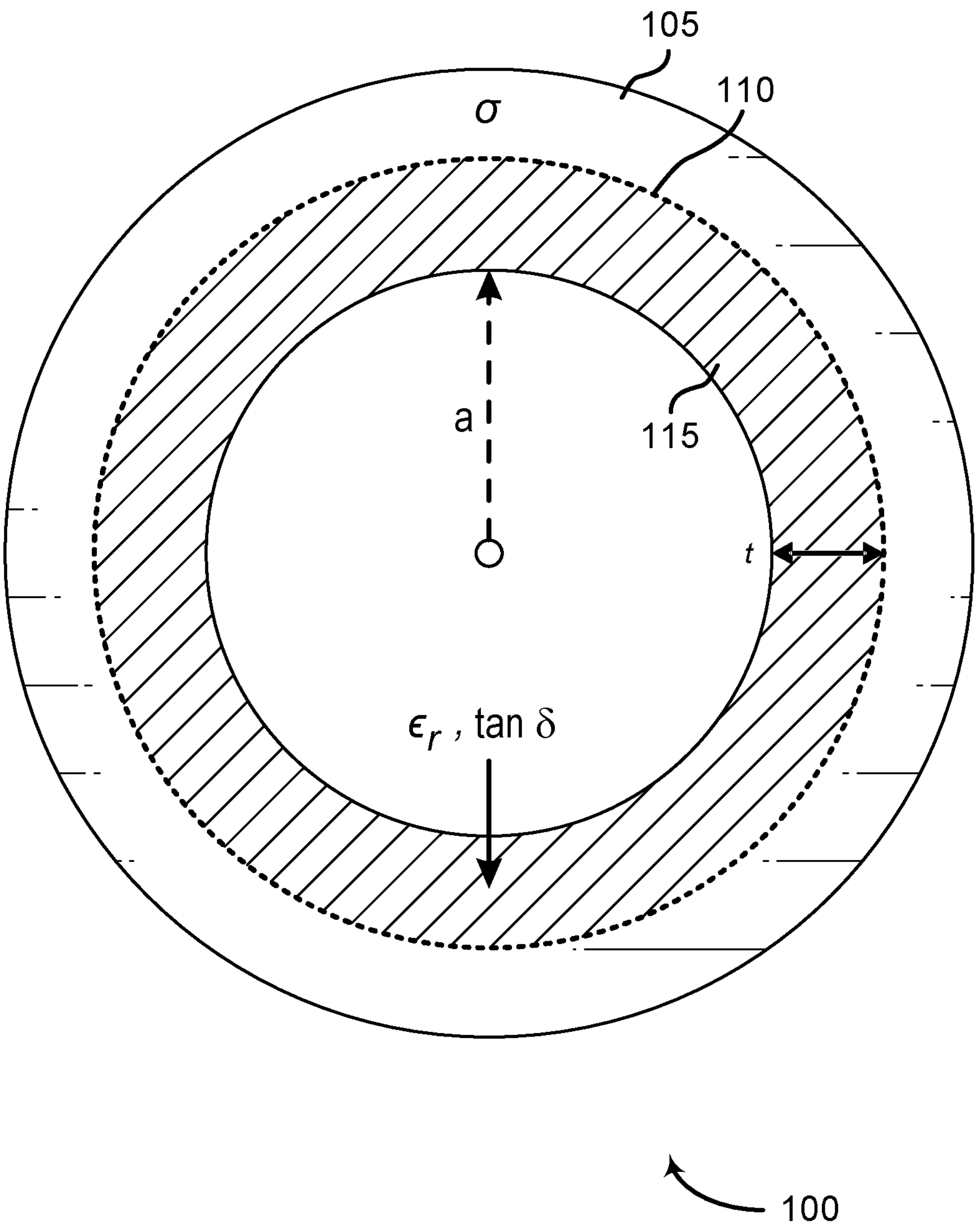
FIG. 1 shows a diagram of a cross section of an example waveguide system according to aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Electromagnetic waves carry energy that may be harnessed or utilized for various applications. A waveguide is a structure that guides waves by restricting the transmission of energy to one direction (e.g., to reduce energy loss as the waves would otherwise expand into three dimensional space according to the inverse square law).

Some applications (e.g., some millimeter wave and terahertz applications) may leverage low attenuation waveguides (e.g., extremely low attenuation microwave transmission lines). As an example, in electron cyclotron heating in fusion systems, millimeter wave power may be transmitted (e.g., 50-200 m) before reaching the plasma (e.g., which may limit the allowable attenuation from the transmission line). Some plasma diagnostic applications (e.g., such as low field side reflectometry), leverage low attenuation waveguides/transmission lines for sensitive detection. Terahertz dynamic nuclear polarization also may leverage low attenuation transmission lines (e.g., to connect the gyrotron sources to the nuclear magnetic resonance (NMR) samples). In general, such systems may leverage low attenuation such as, for example, at least less than 0.1 dB/m.

Some of such applications operate in a frequency regime, which may include or be referred to as the "THz gap". Above 300 GHz, Ohmic loss from metallic structures grows and it may be difficult to machine wavelength sized features (e.g., as such corrugations). Corrugated waveguides, which typically perform well at transmitting millimeter waves, may therefore be impractical to manufacture for frequencies above 300 GHz. In a terahertz regime, dielectric materials may impose too much loss (e.g., particularly for high power systems).

Low attenuation transmission lines (e.g., such as low attenuation transmission lines in the millimeter to THz range) may be designed with a large cross section relative to the wavelength, resulting in more than one propagation mode below cutoff at the operating frequency. Such waveguides with multiple propagating modes may be referred to as overmoded. Smooth wall metallic waveguides may be efficiently manufactured, but the fundamental transverse electric (TE) mode (e.g., TE11 mode) has relatively high attenuation for such smooth wall metallic waveguides. In cylindrical waveguides, operating at the TE01 mode can have very low loss, but such may be susceptible to mode conversion from curvature, defects, and transitions such as miter bends. Accordingly, engineers may design overmoded transmission lines. For example, overmoded transmission lines may be designed that propagate in the HE11 mode (e.g., which has attenuation orders of magnitude less than TE11 and is more robust to mode conversion than TE01).

Corrugated waveguides can support extremely low loss hybrid electric modes (e.g., such as HE11 mode propagation) and can handle large power levels (e.g., due to all metal construction of corrugated waveguides). In some aspects, bandwidth may be limited, for example, by Bragg reflections that occur when the corrugation period exceeds one-half wavelength. Such reflections may cause high attenuation at some frequencies, and it may be difficult to manufacture corrugations with some corrugation periods (e.g., such as corrugation periods less than 0.5 mm, corresponding to Bragg reflections above 300 GHz). Corrugated waveguides may therefore become impractical or inefficient at such higher frequencies.

In some scenarios, dielectric tube waveguides may be used (e.g., for applications when mode purity at the output is important). In some aspects, all dielectric tube waveguides may leak, may be lossier than their all metal counterparts, may not be suitable for low attenuation, etc.

Dielectric lined waveguides (DLWGs) use a thin layer (e.g., typically sub-wavelength dielectric layer) to establish a reactive wall impedance and support hybrid electric mode propagation (e.g., HE11 mode propagation). Unlike corrugated waveguides, some reflection (e.g., Bragg reflection) may not occur in dielectric lined waveguides, such that dielectric lined waveguides may operate over multiple bandwidths. In some aspects, applying thin dielectric layers may be more efficient (e.g., more efficient to manufacture relative to machining millimeter sized corrugations required for high frequencies).

DLWGs may be used in high frequency (e.g., TE01 transmission line) communication networks. Further, DLWGs may have various applications in other THz fields. In some examples, glass tubing may be coated in silver and polystyrene (e.g., at 1 THz to 3, which may be used for THz linear electron acceleration). As operating frequencies continue to increase, corrugated waveguides may demand improvements or alternative approaches for low attenuation transmission lines (e.g., because of the difficulty in machining increasingly fine corrugations).

According to one or more aspects of the present disclosure, DLWGs may be implemented as an effective alternative to corrugated waveguides (e.g., where DLWGs may more efficiently operate at higher frequencies). Systems and technology described herein may have numerous applications, including applications in electron cyclotron heating, terahertz communications, and a variety of other industrial and scientific technologies.

One or more aspects of the present disclosure include coating the inside of an overmoded, smooth wall metallic waveguide with a thin dielectric layer. Coating the inside of a waveguide with a dielectric layer, as described in more detail herein, may result in similar boundary conditions to corrugated waveguides and may achieve extremely low transmission loss (e.g., propagating the HE11 mode). Such dielectric lined waveguides are an efficient (e.g., cost-effective) alternative to corrugated waveguides (e.g., for broadband microwave transmission, particularly at frequencies above 300 GHz). Theoretical models and analytic methods for computing attenuation are also described. In some aspects, low power transmission measurements may be used to characterize the propagation mode of dielectric lined waveguides described herein (e.g., to analyze beams radiated from waveguide apertures). The systems and techniques described herein may improve hybrid electric mode purity (e.g., HE11 mode purity of approximately 98%). Furthermore, attenuation may be quantified (e.g., with low power Fabry-Perot measurements), verifying low loss performance of the described waveguide systems and techniques. Dielectric lined waveguides described herein may have applications in many fields demanding low attenuation millimeter and terahertz transmission (e.g., such as radar, high-frequency communication systems, THz dynamic nuclear polarization, electron cyclotron heating in magnetically confined fusion experiments, etc.).

FIG. 1 shows an example of a waveguide system 100 according to aspects of the present disclosure. In one aspect, waveguide system 100 includes tube structure 105 and layer 115. In one aspect, tube structure 105 includes interior 110. Waveguide system 100 is an example of, or includes aspects of, the corresponding element described with reference to FIGS. 2 and 3. Tube structure 105 is an example of, or includes aspects of, the corresponding element described with reference to FIG. 2.

Waveguide system 100 may be constructed to carry (e.g., guide) waves over a wide portion of the electromagnetic spectrum. In some examples, waveguide system 100 may be designed for applications in microwave frequency ranges and/or optical frequency ranges. Depending on the frequency, a waveguide system 100 (e.g., tube structure 105) may be constructed from either conductive or dielectric materials. Waveguide system 100 may be used for transferring both power and communication signals.

Waveguide systems 100 used at optical frequencies may include dielectric waveguide systems (e.g., tube structures 105 in which a dielectric material with high permittivity, and thus high index of refraction, is surrounded by a material with lower permittivity). The waveguide system 100 (e.g., the tube structure 105) guides waves (e.g., optical waves) by total internal reflection. In some examples, optical waveguide systems 100 may include optical fiber systems.

In some aspects, waveguide system 100 may be approximated with an effective wall impedance model. Further, in various examples, some waveguide systems 100 may expand on the attenuation of certain modes in DLWGs, a TE01 transmission line network (e.g., a TE01 waveguide system 100) may be implemented based on DLWGs, multilayer dielectric lined waveguide systems 100 may be 115 implemented for infrared transmission, etc. The wall impedance method for analyzing DLWGs involves solving the dispersion relationship for a waveguide system 100 with an arbitrary wall impedance, where the impedances are computed using a radial transmission line model of the waveguide wall.

For instance, FIG. 1 may illustrate aspects of a waveguide system 100 including a cylindrical waveguide (e.g., a cylindrical tube structure 105) with an inner radius α and arbitrary wall impedances.

As one example, a waveguide system 100 (e.g., a tube structure 105 and layer 115) may be configured as (e.g., or defined as) a cylindrical waveguide with an inner radius α and arbitrary wall impedances. In some aspects, separate impedances may be defined in the transverse electric and transverse magnetic directions, defined by Equation (1), where all fields may be assumed to have $e^{j\omega t-jk_nZ}$ dependence.

$$Z_{TE} = \left.\frac{E_\theta}{H_z}\right|_{r=a} \quad (1)$$

$$Z_{TM} = -\left.\frac{E_z}{H_\theta}\right|_{r=a}$$

In some aspects, a waveguide system 100 may be large and overmoded such that the waveguide radius is much larger than the wavelength (a>>λ). The dispersion relationship for such a waveguide may be given by Equation (2):

$$\left(\frac{J_p'(X_n)}{X_nJ_p(X_n)} + \frac{j}{\omega\varepsilon_0 aZ_{TM}}\right)\left(\frac{J_p'(X_n)}{X_nJ_p(X_n)} + \frac{jZ_{TE}}{\omega\mu_0 a}\right) = \frac{k_n^2p^2}{k_0^2X_n^4}, \quad (2)$$

where $X_n$ is the dimensionless mode root of mode n given by Equation (3), $k_0$ is the free space wave number given by Equation (4), p is the azimuthal mode index, ω is the angular frequency, and $k_n$ is the complex axial wavenumber of propagation for mode n. The function $J_p(*)$ denotes a Bessel function of order p, and J'p (*) denotes the derivative with respect to the argument of the Bessel function.

$$X_n^2 = a^2(k_0^2 - k_n^2) \quad (3)$$

$$k_0^2 = \omega^2\varepsilon_0\mu_0 \quad (4)$$

The mode roots can be calculated by using a root finding algorithm to solve for the $X_n$ which satisfies Equation (2). The axial wavenumber $k_n$ may be computed from the mode root using Equation (3). This axial wavenumber is defined by Equation (5):

$$k_n=\beta_n-j\alpha_n; \quad (5)$$

where the real and imaginary parts of $k_n$ correspond to the phase propagation constant and attenuation of mode n respectively.

Wall impedances may be described with an equivalent transmission line model in the radial direction of the waveguide system 100. The input impedance for any transmission line may be given by Equation (6):

$$Z_{in} = Z_0\frac{Z_L + jZ_0\tan(kl)}{Z_0 + jZ_L\tan(kl)}, \quad (6)$$

where $Z_0$ is the characteristic impedance of the transmission line, k is the complex wavenumber in the waveguide, and $Z_L$ is the load impedance at the end of the transmission line. The length of the transmission line, l, may be given by the thickness of the dielectric layer (e.g., the thickness of layer 115). In some aspects, the wavenumber for the radial transmission line is the same for TE and TM waves.

$$k = \sqrt{k_e^2 + k_n^2}, \quad (7)$$

where $k_e^2=\omega^2\varepsilon\mu_0$ is the complex wavenumber in the dielectric material. The characteristic impedances for the radial transmission line may be different for TE and TM modes.

$$Z_s = \frac{1+j}{\sigma\delta}; \quad (8)$$

$$\delta = \frac{1}{\sqrt{\pi f\mu\sigma}}, \quad (9)$$

where σ is the conductivity of the metal wall, δ is the skin depth, and $f$ is the frequency. By accounting for the conductivity loss in the metal wall and the dielectric loss in the layer, the solution to the dispersion equation can provide the attenuation of a mode in the waveguide. In some examples (e.g., in examples where the metal wall is a perfect electric conductor and set $Z_L$=0), computing the wall impedances using equations 6, 7, and 8 may result in similar approximations in an effective wall impedance model.

As used herein, anodizing may generally include or refer to an electrolytic passivation process used to increase the thickness of the natural oxide layer 115 on the surface of metal parts. Such processes may be referred to as anodizing because the part to be treated (e.g., the interior 110 of the tube structure 105) forms the anode electrode of an electrolytic cell. In some aspects, anodizing increases resistance to corrosion and wear, and anodizing provides better adhesion for paint primers and glues than bare metal does. Anodic films can also be used for several cosmetic effects, either with thick porous coatings that can absorb dyes or with thin transparent coatings that add reflected light wave interference effects.

Anodizing may also be used to prevent galling of threaded components and to make dielectric films for electrolytic capacitors. In some cases, anodic films may be applied to protect aluminum alloys (e.g., and some processes may also be implemented for titanium, zinc, magnesium, niobium, zirconium, hafnium, tantalum, etc.).

In some aspects, anodizing changes the microscopic texture of the surface and the crystal structure of the metal near the surface. For instance, in some aspects, anodizing the interior 110 of the hollow tube structure 105 may change the microscopic texture of the interior 110 surface of the tube structure 105 and the crystal structure of the metal near the surface (e.g., of the tube structure 105 metal near the interior 110 surface). In some cases, thick coatings may be normally porous, so a sealing process may be implemented to achieve corrosion resistance. Anodized aluminum surfaces, for example, are harder than aluminum but have low to moderate wear resistance that can be improved with increasing thickness or by applying suitable sealing substances.

Anodizing processes may raise the surface since the oxide created occupies more space than the base metal converted. In some aspects, the thickness of the anodizing layer 115 may be taken into account when choosing the machining dimensions of the tube structure 105 and/or the interior 110 of the tube structure 105.

Figure 2:
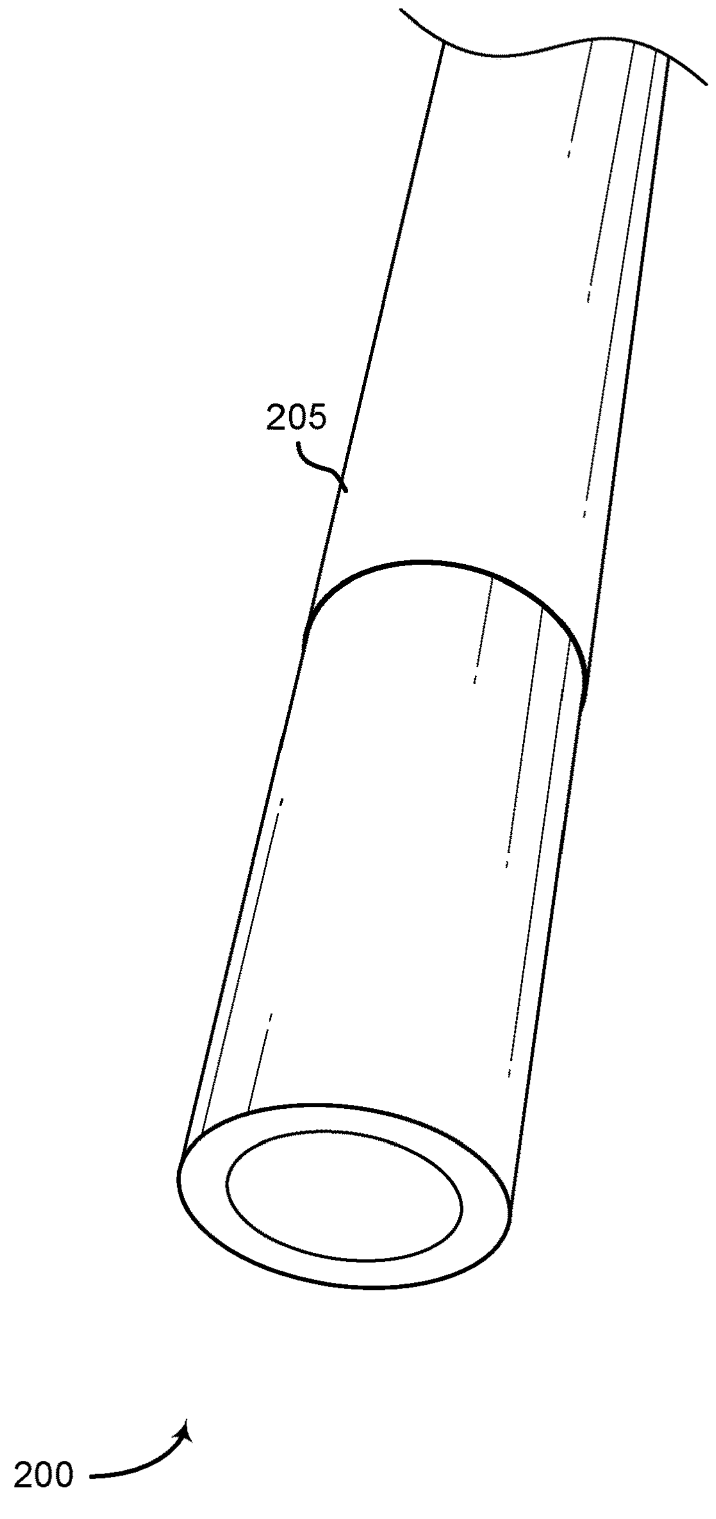
FIG. 2 shows an example waveguide according to aspects of the present disclosure.

FIG. 2 shows an example of a waveguide system 200 according to aspects of the present disclosure. In one aspect, waveguide system 200 includes tube structure 205. Waveguide system 200 is an example of, or includes aspects of, the corresponding element described with reference to FIGS. 1 and 3. Tube structure 205 is an example of, or includes aspects of, the corresponding element described with reference to FIG. 1.

By coating the inside of an overmoded, smooth wall metallic tube structure 205 (e.g., of waveguide system 200) with a thin dielectric layer (e.g., by coating the interior of tube structure 205 with a thin dielectric layer), similar boundary conditions to corrugated waveguides may be obtained by the waveguide system 200, low transmission loss propagating the HE11 mode may be achieved by the waveguide system 200, etc. Such dielectric lined waveguide systems 200 may thus provide an efficient (e.g., cost-effective) alternative to corrugated waveguides (e.g., for broadband microwave transmission, particularly at frequencies above 300 GHz). Dielectric lined waveguide systems 200 described herein may have applications in many fields demanding low attenuation millimeter and terahertz transmission (e.g., such as radar, high-frequency communication systems, THz dynamic nuclear polarization, electron cyclotron heating in magnetically confined fusion experiments, etc.).

In some aspects, by sweeping the coating thickness (e.g., of layer 115) DLWGs may be designed at certain frequencies. In some examples, minimum attenuation occurs at a dielectric coating thickness $t=0.160\lambda$ and max attenuation occurs at $t=0.267\lambda$ (e.g., both the TE and the TM wall impedance may be reactive in DLWGs, resulting in a more complicated relationship with attenuation).

In one example, waveguide system 200 (e.g., a DLWG) may be fabricated using stock aluminum tubing with an outer diameter of 44.45 mm, an inner diameter of 31.50 mm, and a length of 1.07 m. The interior of the tubes may be anodized with alumina (e.g., with a 50 μm coating and a 80 μm coating for two example waveguides, which corresponds to minimizing transmission loss at approximately 195 GHz and 310 GHZ, respectively).

In some aspects, the effective dielectric of such a thin layer may be sensitive to porosity and uniformity of the anodized layer (e.g., of layer 115).

At millimeter and THz frequencies, surface roughness is known to play a large role in the effective conductivity of the surface, especially if it is on the order of the skin depth. For reference, the skin depth of aluminum at 150 GHz is approximately 0.2 μm.

In some examples, a corrugated waveguide may have less attenuation than a DLWG. DLWGs, however, continue to propagate after their initial stop band, and have multiple bandwidths over which low attenuation is possible. The stop bands in the DLWGs correspond to frequencies where the dielectric electrical thickness is nearly a multiple of a quarter wavelength. DLWGs with thinner coatings may have greater bandwidth in-between stop bands, since the quarter wave harmonics are spaced farther apart. Outside of the stop bands, DLWGs may have much lower attenuation than a metallic smooth wall waveguide.

Figure 3:
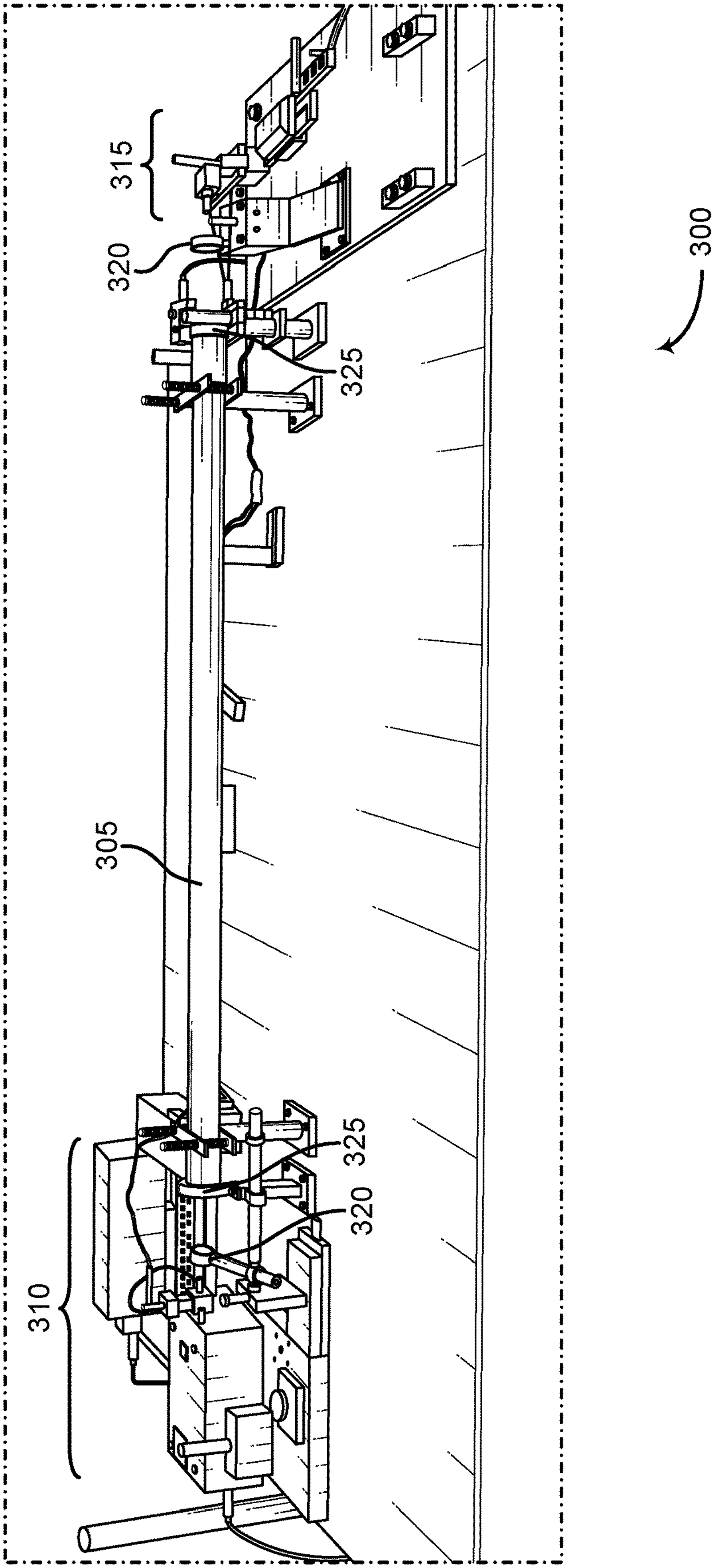
FIG. 3 shows an example waveguide system according to aspects of the present disclosure.

FIG. 3 shows an example of an experimental waveguide system 300 according to aspects of the present disclosure. In one aspect, the waveguide system 300 for attenuation measurement includes metallic waveguide 305, energy source 310, detector 315, lens 320, and mirrors 325. According to some aspects, energy source 310 directs microwave energy through the hollow metal tube (e.g., metallic waveguide 305). Metallic waveguide 305 is an example of, or includes aspects of, the tube structure element described with reference to FIGS. 1 and 2. Waveguide system 300 is an example of, or includes aspects of, the corresponding element described with reference to FIGS. 1 and 2.

Measuring the attenuation in low-loss waveguides may be difficult (e.g., due to the small variation of transmitted power and the presence of standing waves). One approach is to include the waveguide in a cavity (e.g., a resonant Fabry-Perot cavity, such that the radiation can make multiple round trips). Such a cavity may be formed by a section of waveguide (e.g., metallic waveguide 305) closed by two mirrors 325 on each end. These mirrors 325 may allow some transmission, since the mirrors 325 are also used to couple the radiation into and out of the cavity. The mirrors 325 may also have reflection losses no greater than the waveguide under test. Some waveguide systems 300 may implement the use of 1D photonic mirrors 325 (e.g., such as 1D photonic mirrors 325 composed of 4 high resistivity silicon discs>10 kΩcm is an effective solution, giving a reflectivity of 0.9995). The thicknesses of the discs and separating air gaps are chosen to match the operating frequency.

As one example, a pair of photonic mirrors with 441 μm discs and 469 μm air gaps may be used with the waveguides to form a cavity operating from 150 to 170 GHz. An amplified multiplier chain (×12) may be coupled to the cavity entrance using a quasi-optical setup with a TPX lens of 35 mm focal length. This optical configuration may result in a beamwidth of 80% of the waveguide diameter (e.g., and may couple into the HE11 guided mode). At the output of the cavity, a 50 mm focal length TPX lens 320 may be used to couple the radiation to a zero biased detector 315. In some cases, the radiation transmitted by the cavity may be measured as a function of the frequency. In some aspects, the multiple resonances of waveguide system 300 may be observed as fitted by a Lorentzian function to determine the mean observed finesse for a given waveguide. The waveguide loss may be obtained by subtracting the known mirror loss from the total cavity loss given by the finesse. The standard deviation of the measured finesse values may be used to provide a confidence interval.

Waveguide system 300 may include a detector 315 (e.g., an energy detector, a wave detector, and electromagnetism detector, an optical instrument, an image sensor, a camera, etc.) for recording or capturing output information from the waveguide system 300 (e.g., for recording or capturing energy output at the metallic waveguide 305 cavity/end). In some cases, the output information (e.g., the detected energy information) may be stored locally, transmitted to another location, etc. For example, a detector 315 may capture energy information using one or more energy sensitive elements that may be tuned for sensitivity to a spectrum of electromagnetic radiation (e.g., the detector 315 may include energy sensitive elements that may be tuned for sensitivity to millimeter spectrum and/or terahertz spectrum of electromagnetic radiation). In some implementations, the resolution of such information may be measured in pixels, where each pixel may relate an independent piece of captured information. Computation methods may use recorded or captured information to reconstruct information about the waveguide system 300 (e.g., the metallic waveguide 305).

In some aspects, one or more elements of waveguide system 300 (e.g., such as energy source 310, detector 315, etc.) may include one or more processors. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

Generally, using an additional experimental waveguide system, an energy source may supply a driving signal to the metallic waveguide (e.g., energy source may supply a driving signal of 13.75 GHZ multiplied by an 8× frequency multiplier). In some cases, the driving signal may be fed into a horn lens assembly (e.g., lens, which transitions from WR8 to a 31.50 mm inner diameter corrugated waveguide in the HE11 mode). The signal propagates through the waveguide sample (e.g., the metallic waveguide) and radiates from the open aperture at an opposite end of the waveguide sample. A field probe on a 3D field scanner (e.g., detector) measures the received power. In some examples, the received signal (e.g., the signal received by detector) may be mixed down (e.g., to 1 GHz) where the amplitude is measured by a spectrum analyzer. By moving the field probe (e.g., detector), the beam pattern can be constructed.

The beam profile of a smooth wall waveguide may be less circularly symmetric and may contain more side lobes than the beam from the DLWG. This is because the HE11 mode becomes a combination of TE11 and TM11, which have different propagation speeds in a smooth wall waveguide. They are therefore out of phase at the output of the waveguide, resulting in an aperture field which is not well matched to free space compared to HE11. Within the waveguide, the DLWGs at both frequencies have circularly symmetric fields that decay at the wall, indicative of the HE11 mode. Accordingly, the DLWGs may support the HE11 mode similarly to corrugated waveguides. The modal purity of each field at the aperture may be computed. The DLWGs show significantly higher modal purity than the smooth wall waveguide and may have comparable purity to the corrugated waveguide (e.g., confirming they are indeed supporting the low loss HE11 mode).

Figure 4:
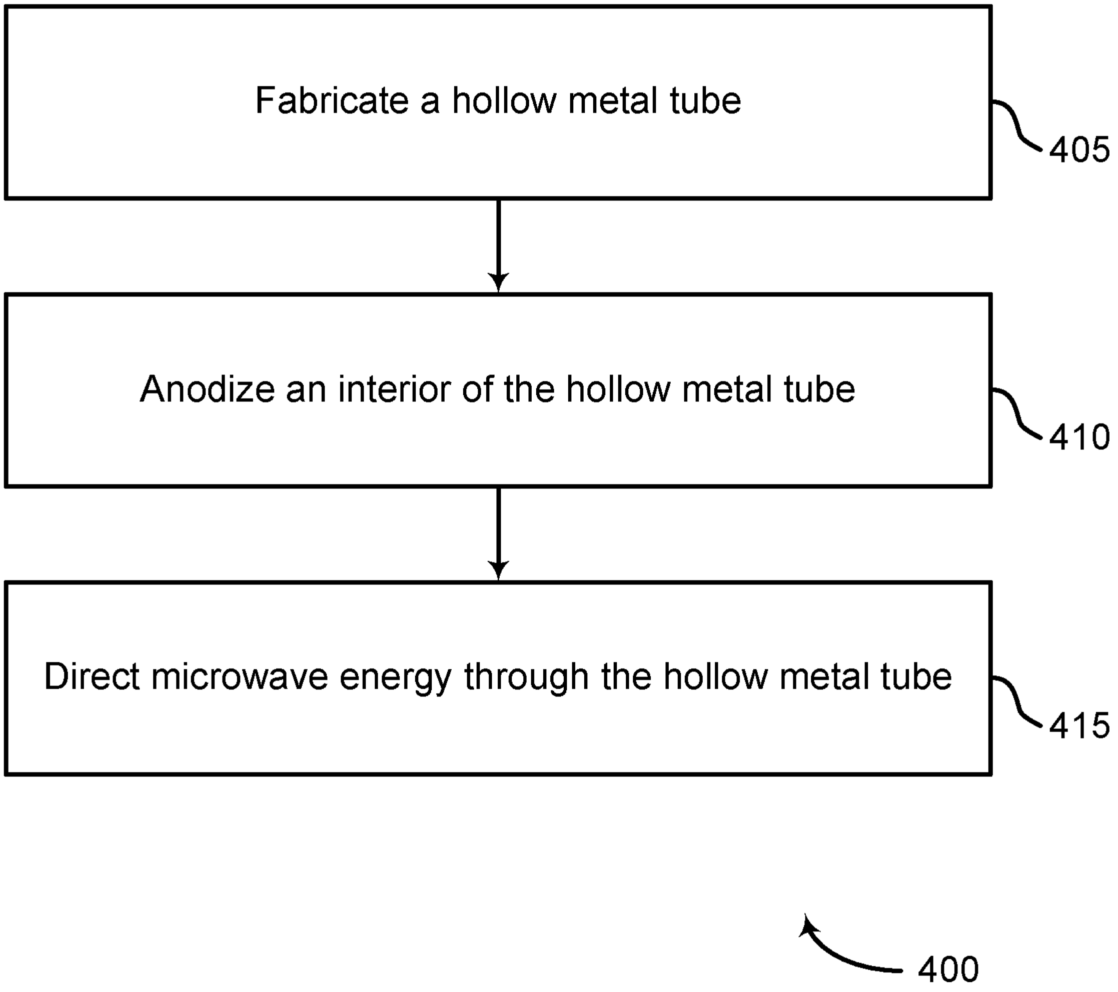
FIG. 4 shows an example of a method for transmission waveguides according to aspects of the present disclosure.

FIG. 4 shows an example of a method 400 for transmission waveguides according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system fabricates a hollow metal tube. In some cases, the operations of this step refer to, or may be performed by, a tube structure as described with reference to FIGS. 1 and 2. In some cases, the operations of this step refer to, or may be performed by, a metallic waveguide as described with reference to FIG. 3.

At operation 410, the system anodizes an interior of the hollow metal tube. In some cases, the operations of this step refer to, or may be performed by, an interior as described with reference to FIG. 1. In some cases, the operations of this step refer to, or may be performed by, a layer (e.g., an anodized layer) as described with reference to FIG. 1.

At operation 415, the system directs microwave energy through the hollow metal tube. In some cases, the operations of this step refer to, or may be performed by, an energy source as described with reference to FIG. 3. In some cases, the operations of this step refer to, or may be performed by, a waveguide system as described with reference to FIGS. 1-3.

Waveguide systems (e.g., DLWGs) described herein may function as very low attenuation transmission lines. DLWGs can be an inexpensive, wide-band means of transmitting mm and THz signals over long distances with low attenuation. As described herein, anodizing is an effective way to create a uniform dielectric layer on the inside of a metallic waveguide. High power testing of DLWGs may demonstrate performance over multiple heating cycles.

Accordingly, the present disclosure includes the following aspects.

An apparatus, system, and method for dielectric lined waveguides for low loss millimeter wave and terahertz transmission are described. One or more aspects of the apparatus, system, and method include a metallic waveguide having a hollow tube structure; an anodized interior of the hollow tube structure; and a microwave energy source directed through the hollow tube structure.

In some aspects, the hollow tube structure comprises a circular cross-section. In some aspects, the hollow tube structure comprises aluminum. In some aspects, the anodized interior comprises aluminum oxide. In some aspects, the microwave energy source has a frequency of at least 100 GHz. In some aspects, the hollow tube structure and the anodized interior configure the metallic waveguide to have 98% HE11 mode purity. In some aspects, the hollow tube structure is without corrugations. In some aspects, the anodized interior of the hollow tube structure comprises a layer of at least 40 microns thickness. In some aspects, the anodized interior of the hollow structure comprises a layer of no more than 90 microns thickness. In some aspects, the anodized interior of the hollow tube structure comprises a layer of no more than 2 microns surface roughness. In some aspects, the hollow tube structure and the anodized interior configure the metallic waveguide to have no more than 1 dB/m attenuation of microwave energy from the microwave energy source in a prescribed frequency range.

A method, apparatus, and system for dielectric lined waveguides for low loss millimeter wave and terahertz transmission are described. One or more aspects of the method, apparatus, and system include fabricating a hollow metal tube; anodizing an interior of the hollow metal tube; and directing microwave energy through the hollow metal tube.

In some aspects, the hollow metal tube is fabricated to comprise a circular cross-section. In some aspects, the hollow metal tube is fabricated to comprise aluminum. Some examples of the method, apparatus, and system further include anodizing the interior of the hollow metal tube with aluminum oxide. Some examples of the method, apparatus, and system further include directing microwave energy having a frequency of at least 100 GHz through the hollow metal tube. In some aspects, the fabricating the hollow metal tube and the anodizing the interior produce a waveguide having 98% HE11 mode purity. In some aspects, the hollow metal tube is fabricated to comprise an interior without corrugations.

Some examples of the method, apparatus, and system further include anodizing the interior of the hollow metal tube with a layer of at least 40 microns thickness.

Some examples of the method, apparatus, and system further include anodizing the interior of the hollow metal tube with a layer of no more than 80 microns thickness.

Some examples of the method, apparatus, and system further include anodizing the interior of the hollow metal tube with a layer of no more than 2 microns surface roughness.

In some aspects, the fabricating the hollow metal tube and the anodizing the interior produce a waveguide having no more than 1 dB/m attenuation of the microwave energy in a prescribed frequency range.

While the invention herein disclosed has been described by means of specific embodiments, examples and applications thereof, numerous modifications and variations could be made thereto by those skilled in the art without departing from the scope of the invention set forth in the claims.

What is claimed is:

1. A waveguide system comprising:

an overmoded metallic waveguide having a hollow tube structure;

an anodized interior of the hollow tube structure, wherein said anodized interior forms a dielectric layer, wherein said hollow tube structure and said dielectric layer configure said metallic waveguide to propagate a HE11 mode having no more than 1 dB/m attenuation of microwave energy for at least one microwave energy frequency range located above 300 GHz; and a microwave energy source directed through the hollow tube structure.

2. The waveguide system of claim 1 further comprising: said hollow tube structure comprising a circular cross-section.

3. The waveguide system of claim 1 further comprising: said hollow tube structure comprising aluminum.

4. The waveguide system of claim 1 further comprising: said anodized interior comprising aluminum oxide.

5. The waveguide system of claim 1 further comprising: said microwave energy source having a frequency of at least 100 GHz.

6. The waveguide system of claim 1 further comprising: wherein said hollow tube structure, and said anodized interior configure said metallic waveguide to have 98% HE11 mode purity.

7. The waveguide system of claim 1 further comprising: said hollow tube structure, wherein said hollow tube structure is without corrugations.

8. The waveguide system of claim 1 further comprising: said anodized interior of said hollow tube structure, wherein said anodized interior comprises a layer of at least 40 microns thickness.

9. The waveguide system of claim 1 further comprising: said anodized interior of said hollow tube structure, wherein said anodized interior comprises a layer of no more than 90 microns thickness.

10. The waveguide system of claim 1 further comprising: said anodized interior of said hollow tube structure, wherein said anodized interior comprises a layer of no more than 2 microns surface roughness.

11. A microwave waveguide method comprising:

fabricating a hollow metal tube;

anodizing an interior of the hollow metal tube to form a dielectric layer, wherein the hollow metal tube is overmoded and configured to propagate a HE11 mode having no more than 1 dB/m attenuation of microwave energy for at least one microwave energy frequency range located above 300 GHz; and directing microwave energy through the hollow metal tube.

12. The microwave waveguide method of claim 11 further comprising:

said fabricating said hollow metal tube comprising fabricating said hollow metal tube comprising a circular cross-section.

13. The microwave waveguide method of claim 11 further comprising:

said fabricating said hollow metal tube comprising fabricating said hollow metal tube comprising aluminum.

14. The microwave waveguide method of claim 11 further comprising:

said anodizing said interior of said hollow metal tube with aluminum oxide.

15. The microwave waveguide method of claim 11 further comprising:

said directing said microwave energy comprises directing microwave energy having a frequency of at least 100 GHz.

16. The microwave waveguide method of claim 11 further comprising:

said fabricating said hollow metal tube, and said anodizing said interior produce a waveguide having 98% HE11 mode purity.

17. The microwave waveguide method of claim 11 further comprising:

said fabricating said hollow metal tube comprising said fabricating said hollow metal tube comprising an interior without corrugations.

18. The microwave waveguide method of claim 11 further comprising:

said anodizing of said interior of said hollow metal tube comprises said anodizing said interior of said hollow metal tube with a layer of at least 40 microns thickness.

19. The microwave waveguide method of claim 11 further comprising:

said anodizing of said interior of said hollow metal tube comprises said anodizing said interior of said hollow metal tube with a layer of no more than 80 microns thickness.

20. The microwave waveguide method of claim 11 further comprising:

said anodizing of said interior of said hollow metal tube comprises said anodizing said interior of said hollow metal tube with a layer of no more than 2 microns surface roughness.

* * * * *